May 22, 1923. 1,456,411
J. W. WARREN
MULTIPLE STAVE MOLD
Filed Oct. 10, 1922 2 Sheets-Sheet 1
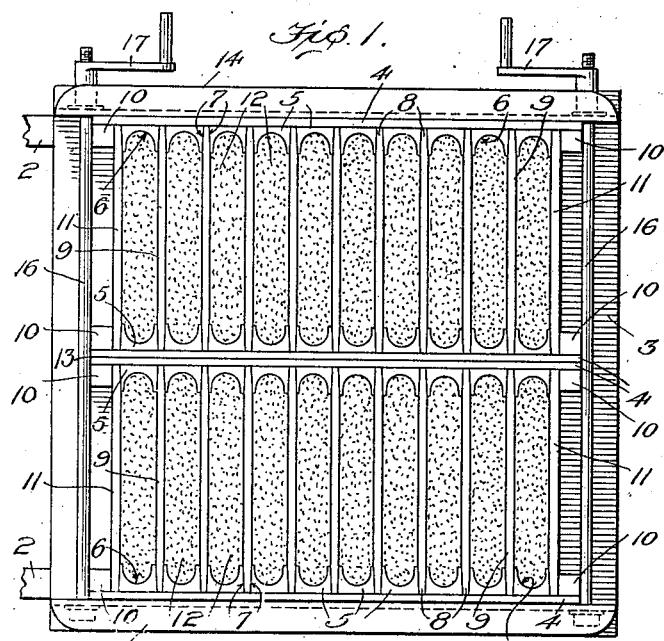
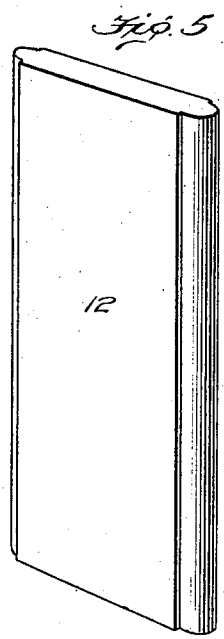
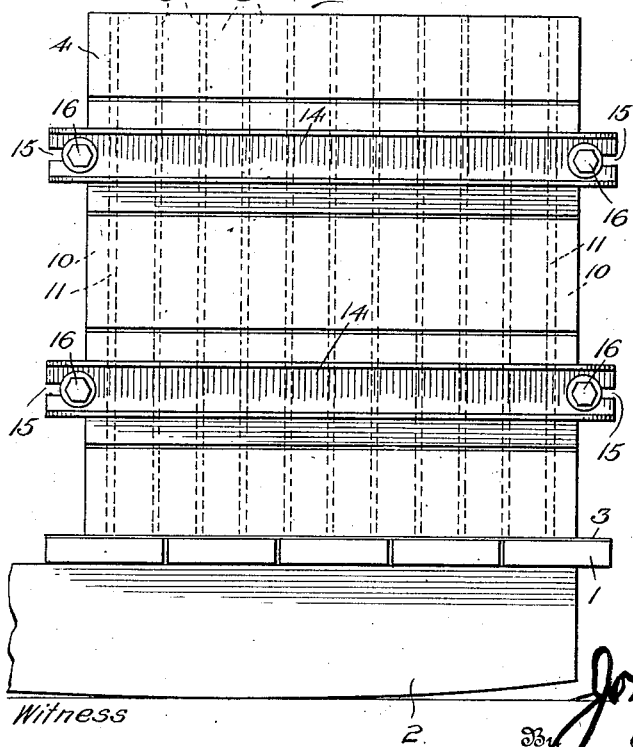
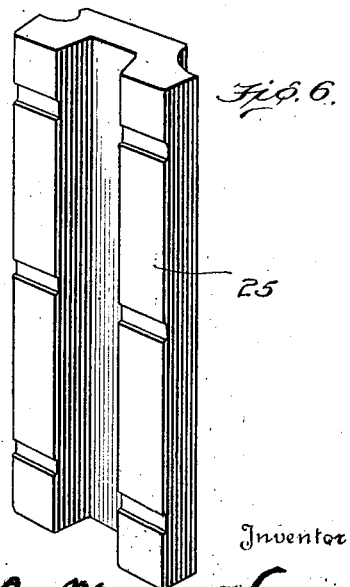
Witness
Edwin L. Bradford
Inventor
John Wright Warren
By Wm C. Dyre
Attorney May 22, 1923.
J. W. WARREN
MULTIPLE STAVE MOLD
Filed Oct. 10, 1922
1,456,411
2 Sheets-Sheet 2
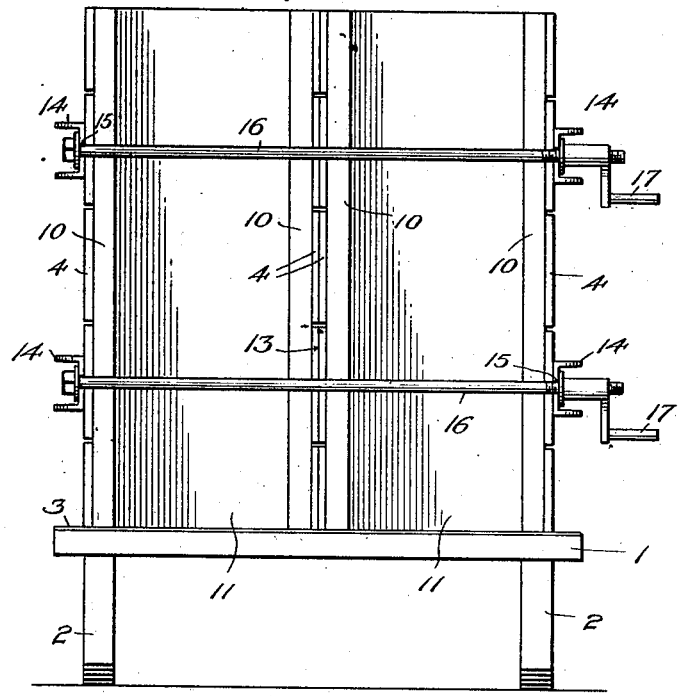
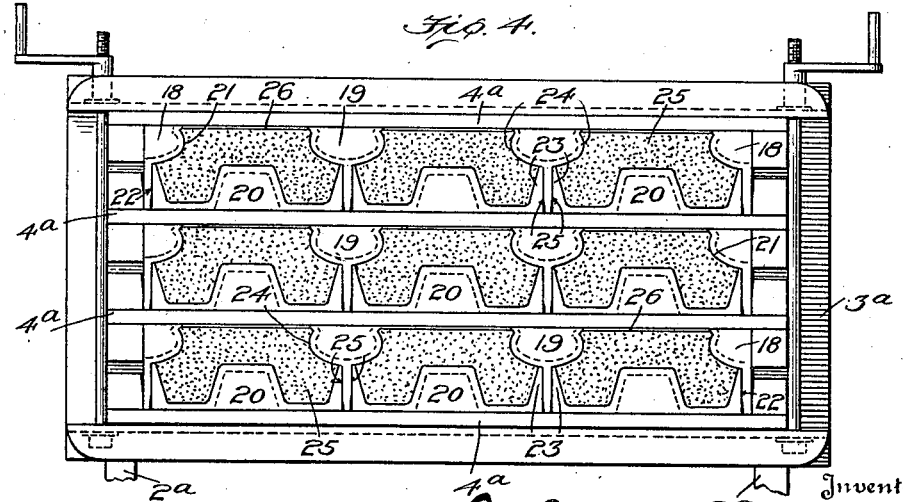
Witness
Edwin L. Bradford
Inventor
John Wright Warren,
By Wm E Dye.
Attorney Patented May 22, 1923.

1,456,411

UNITED STATES PATENT OFFICE.

JOHN WRIGHT WARREN, OF ELIZABETHTON, TENNESSEE.

MULTIPLE-STAVE MOLD.

Application filed October 10, 1922. Serial No. 593,561.

*To all whom it may concern:*

Be it known that I, JOHN WRIGHT WARREN, a citizen of the United States, residing at Elizabethton, in the county of Carter and State of Tennessee, have invented certain new and useful Improvements in Multiple-Stave Molds; and I do hereby declare the following to be a full, clear, and exact description of the invention, such as will enable others skilled in the art to which it appertains to make and use the same.

This invention relates to improvements in molding apparatus and more particularly to a novel mold for use in forming masonry panels and pilasters suitable for use in building silos and the like.

The primary object of the invention is to furnish improved molds having all of their parts separable in order that the molded articles may be rapidly removed from the molds.

Another object of the invention is to provide molds capable of forming a multiplicity of panels or pilasters at one time so that the requisite number of panels or pilasters for a given job may be expeditiously manufactured.

A further object is to furnish a mold platform having rockers to enable the molds to be agitated while they are being filled with plastic material, so that the plastic mass will enter all parts of the molds and will become compacted to a greater extent than if the molds remain stationary while being charged. In the present construction these rockers are spaced sufficiently far apart to enable the lifting truck to be moved into a position beneath the mold platform, and then the platform with the charged molds may be transported to any suitable storage space.

Another object is to provide improved molds of unit form, the units of which may be individually moved over the mold platform to facilitate the removal of the formed articles from the mold.

With the foregoing objects outlined and with other objects in view which will appear as the description proceeds, the invention consists in the novel features hereinafter described in detail, illustrated in the accompanying drawings and more particularly pointed out in the appended claims.

Referring to the drawings:

Figure 1 is a top plan view of one form of the improved molds.

Fig. 2 is a side view of the same.

Fig. 3 is an end view.

Fig. 4 is a top plan view of another form of the invention.

Fig. 5 is a perspective view of one of the panels formed in the mold illustrated in Figs. 1 to 3 inclusive.

Fig. 6 is a similar view of a pilaster formed in the mold shown in Fig. 4.

In the embodiment of the invention illustrated in Figures 1, 2, 3 and 5, 1 designates a platform constructed of any suitable material but preferably of wood in order to provide a light structure. This platform is mounted on rockers 2, which as best shown in Figure 3, are spaced sufficiently far apart to enable a lifting truck to be inserted between the rockers and beneath the platform. The upper surface of the platform is preferably provided with a sheet 3 of galvanized metal or the like adapted to prevent leakage of the plastic material from the molds and to facilitate the sliding of the mold units along the platform.

Each of the mold units preferably consists of vertical walls 4 having their lower edges resting freely on sheet 3. Each wall carries a series of vertically arranged end forms 5, which are spaced relatively to one another and have concaved inner surfaces as shown at 6. The adjacent side faces of the end forms converge outwardly as shown at 7 to receive the wedge-shaped side edge portions 8 of spacing partitions 9. The spacing partitions and end forms 5 also rest freely on the platform sheet 3, in order that they may be slid along the platform with the unit of which they form part.

The side walls 4 are provided at each end with vertically arranged strips 10, which are freely secured to the walls 4 and function to hold the end partitions 11 in place.

As clearly shown in Figure 1, a number of these units may be placed on the platform, and each unit is capable of molding a series of panels 12. When the units are placed on the platform, the side walls 4 of adjacent units will be placed back to back as shown at 13 in Figure 1, and in order to hold the units in assembled relation, the molds are provided with side angle bars 14 having slots 15 at their ends designed to receive the bolts 16, each of which is provided at one end with a handle nut 17.

When the molds are assembled in the manner shown, the plastic material may be poured in at the top and during the pouring the molds are agitated by rocking the platform 1, and this causes the mass to be compact within the molds. After the molds have been filled, the lifting truck heretofore referred to, may be inserted beneath the platform, and then the molds may be transported to a suitable storage space. When the panels 12 have become sufficiently hard, they may be readily removed from the molds in the following manner. First the handle nuts 17 are screwed sufficiently to permit the detachment of the same from the bars 14, and then the bars 14 may be detached from the side walls 4. Then one of the units may be slid in its entirety, over the platform 1 to a place removed sufficiently far from an adjacent unit, to enable one of the intermediate walls 4 and said outer wall 4 to be removed from the unit. When these walls are detached, the end forms 5 and blocks 10 are removed with the same, and then the partitions 9 of said unit will be the only portion of that unit remaining on the platform. Then the panels 12 may be readily removed from the platform by alternately taking off the partitions 9—11 and panels 12.

In the embodiment of the invention illustrated in Figure 4 the parts above the platform sheet 3ª rest freely on said sheet, in order that the parts may be manipulated in a manner similar to that described in the construction shown in Figures 1 to 3 inclusive. In the pilaster mold shown in Figure 4, however, the forms are detachable from the vertical walls 4ª. These forms preferably consist of singles 18, doubles 19 and ridge pans 20. It will be noted that each single has an outer convex side surface 21 merging into a plane surface 22, the latter surface cooperating with an end flange 23 provided on one of the ridge pans 20. Each double 19 has oppositely disposed convex surfaces 24 merging into plane surfaces 25 that cooperate with the end flanges 23 of adjacent ridge pans 20.

When the parts are assembled, the plastic material may be poured in from the top and during this time the mold may be agitated as the platform is mounted on rockers 2ª in a manner similar to that shown in Figure 1.

In the pilaster mold, a series of the pilasters may be removed as a unit, and to accomplish this, one of the side walls 4 may be first removed from the platform, then the singles 18 and doubles 19 may be pulled away from the molded pilasters 25. At this time the exposed pilasters may be detached from the ridge pans 20, and subsequently said ridge pans may be detached. Then a succeeding unit may be discharged and so on.

Where the pilasters are to be employed in making silos, it is preferred to make the inner faces of the pilasters smooth and to accomplish this, galvanized strips 26 are arranged on the inner faces of the walls 4ª.

From the foregoing, it is believed that the construction, operation and advantages of the invention may be readily understood by those skilled in the art, and it is apparent that various changes may be made in the embodiments illustrated, without departing from the spirit of the invention as expressed in the claims.

What is claimed and desired to be secured by Letters Patent is:

1. An apparatus of the class described including in combination a freely portable platform, rockers supporting said platform and spaced apart, the space beneath said platform and between said rockers being unobstructed in order to permit a lifting truck to be inserted beneath the platform, and a series of removable molds carried by said platform.

2. An apparatus of the class described including in combination a platform, a plurality of vertically arranged walls carried by said platform and disconnected from the latter, forming members arranged on one of said walls in spaced relation and having their adjacent surfaces converging towards the wall on which they are arranged, vertical partitions arranged between the walls and having wedge-shaped ends adapted to occupy the spaces between said forming members, and means for forcing the outer vertical walls toward one another for causing the wedge-shaped ends of the partitions to form tight joints with said forming members.

3. An apparatus of the class described including in combination a platform, a plurality of vertically arranged walls resting freely on and disconnected from said platform, forming members arranged between said walls and providing chambers having their lower ends closed by the platform, certain of the forming members having centrally disposed ridge pans and the other forming members having bulged portions arranged opposite to the ends of the forming members having the ridge pans, and detachable means for holding said walls and forming members in assembled relation.

In testimony whereof I affix my signature, in presence of two subscribing witnesses.

JOHN WRIGHT WARREN.

Witnesses:
   E. H. RAMSEY,
   EARL B. BEASLEY.